May 9, 1961 D. W. McKEE 2,983,394
FREIGHT HANDLING MEANS AND METHOD
Filed Sept. 26, 1957 5 Sheets-Sheet 1

INVENTOR.
DALE W. McKEE
BY *J. Frederick Bechtel*
ATTY.

INVENTOR.
DALE W. McKEE

INVENTOR.
DALE W. McKEE

May 9, 1961 D. W. McKEE 2,983,394
FREIGHT HANDLING MEANS AND METHOD
Filed Sept. 26, 1957 5 Sheets-Sheet 5
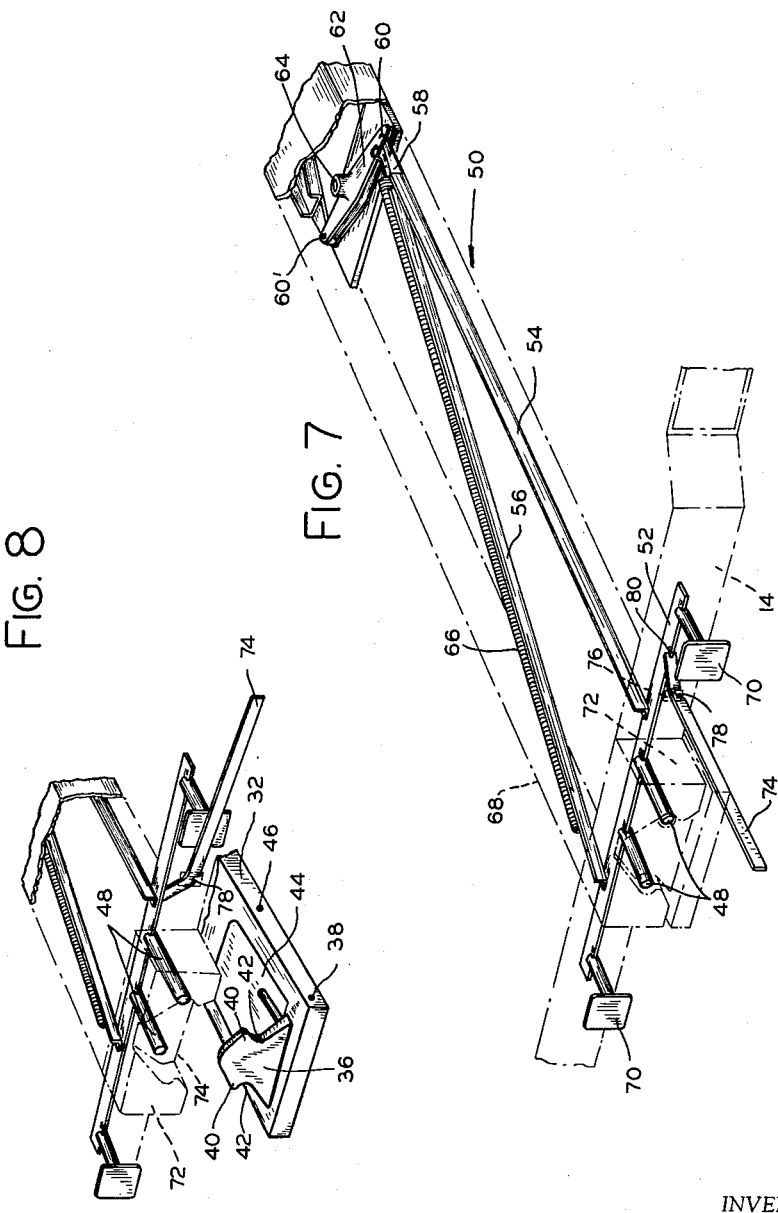
INVENTOR.
DALE W. McKEE
BY *J. Frederick Bechtel*
ATTY.

United States Patent Office 2,983,394
Patented May 9, 1961

2,983,394

FREIGHT HANDLING MEANS AND METHOD

Dale W. McKee, Battle Creek, Mich., assignor to Clark Equipment Company, a corporation of Michigan Filed Sept. 26, 1957, Ser. No. 686,463

9 Claims. (Cl. 214—38)

My invention relates to the handling and transporting of freight, and more particularly concerns provision of means and method for effectively associating and disassociating suitable portable freight carrier means with transporting means, such as truck trailers and the like, and for storing such freight carrier means separately from transporting means.

In the copending U.S. patent application Ser. No. 577,118 of Jack E. Loomis, filed April 9, 1956 (common assignee), which application is a continuation-in-part of prior U.S. application, Ser. No. 531,489, filed August 30, 1955, now abandoned, there is fully disclosed a novel freight handling means and method for conveniently transporting freight without undue handling or loading and unloading from one transporting means to another: such is accomplished by utilizing portable freight carriers or containers of suitable dimension which may be automatically anchored to and disconnected from a carrier supporting surface of transporting means, such for example as a railroad flatcar, a flatbed truck-trailer, a ship or aircraft, etc., by means of known materials handling equipment, such as fork lift trucks, straddle trucks and cranes, which materials handling equipment is also available for transferring such freight carrier means from one such transporting means to another. Numerous embodiments of freight carrier means, transporting means, materials handling equipment, and latching and anchor mechanism associated with the freight carrier means and transporting means are fully disclosed in said copending application.

It has been found that in the use of such a freight handling system instances frequently arise, such as at relatively small freight terminals, wherein the use of such materials handling equipment as work lift trucks, straddle trucks, cranes and the like is uneconomic due to the relatively small number of portable freight carriers which are handled in a given period of time.

According to my invention, I have provided a novel means and method for effectively and economically associating and disassociating suitable portable freight carrier structure with such transporting means for example as truck-trailers without the necessity for utilizing such materials handling equipment as aforesaid.

It is therefore a principal object of my invention to provide new means and method for detaching portable freight carrier means from transporting means and for retaining said freight carrier means separately from the transporting means.

A further object of my invention is to provide storage means for portable freight carrier structure which is also operable to associate and disassociate with transporting means such freight carrier structure.

A further object of my invention is to provide a simple, low cost, and effective method for engaging and disengaging portable freight carrier structure with transporting means by utilizing the transporting means as a motivating means to accomplish such engagement and disengagement as aforesaid.

Another object of this invention is to provide a combination of transporting means, portable freight carrier means and storage means, wherein the storage means is connectible to both the transporting means and the freight carrier means in such a manner that the combination may be utilized to firstly disassociate the freight carrier means from the transporting means for storing the freight carrier means separately from the transporting means and to subsequently reassociate the freight carrier means with the same or another transporting means.

The above and other objects and advantages of my invention will appear from the detailed description hereinbelow of a preferred embodiment thereof.

In carrying out my invention I provide a pair of generally upright rack means which are located in spaced parallel relation such that attached transporting and portable freight carrier means may be driven therebetween, said pair of rack means being connectible together by means of load bearing elements which are associatable with the freight carrier means and which are connectible to the transporting means by tension members. Latching and anchor mechanism is associated with the freight carrier and transporting means, respectively, for normally holding the one in locked relationship to the other for transportation thereof to a given destination. When it is desired to disassociate the freight carrier means from the transporting means the pair of rack means is associated with both the freight carrier and transporting means in such a manner that horizontal movement of the transporting means acts through the rack means and one or more of the tension members to cause an upward movement of the load bearing members, thereby effecting disassociation of the freight carrier means from the transporting means, whereafter the tension members may be disconnected from the transporting means and the latter means moved from under the freight carrier means.

Contrariwise, the freight carrier means may be reassociated with the transporting means by properly locating the latter means between the pair of rack means and connecting the tension members thereto, whereafter movement of the transporting means in an opposite direction imposes a force on one or more of the tension members to cause reassociation of the carrier means with the transporting means in a predetermined manner.

In the drawings:

Figure 7 is a schematized perspective view of a part of the latching and anchor mechanisms which are associated with the freight carrier and transporting means, respectively; and Figures 8 is a schematized perspective view showing a portion of the mechanism of Figure 7 in different operative relation.

Figure 1:
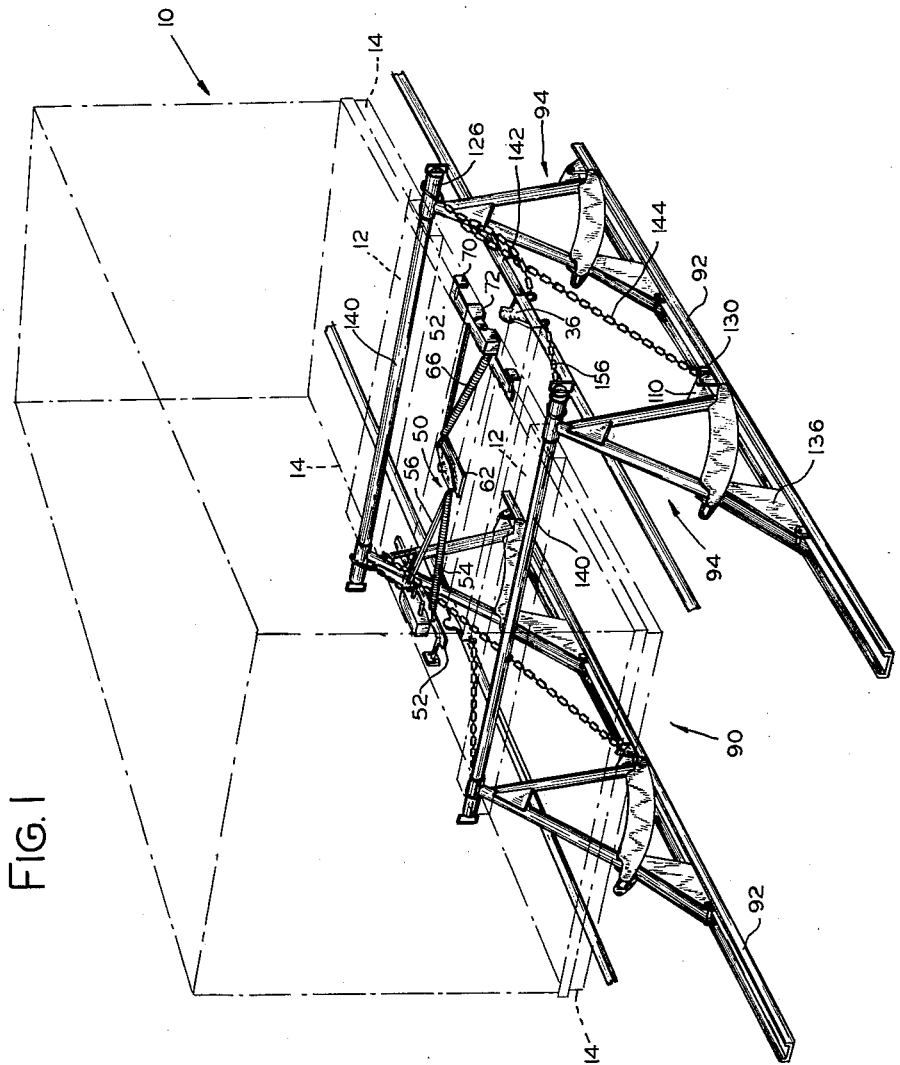
Figure 1 is a schematic representation in perspective showing, among other things, the essentials of my invention, and wherein freight carrier means is illustrated as suspended on rack means above freight transporting means preparatory to associating the freight carrier with the transport means or removing the transport means from under the carrier means, as desired.

Referring now in detail to the drawings, a freight carrier means 10 includes in the base structure thereof a pair of longitudinally spaced hollow box-like channel members 12, 12 which extend transversely between parallel side rails 14, 14 of the base structure. Such are designed for the axial entry and reception, for example, of fork tines of a conventional material handling lift truck, not shown, for supporting the freight carrier means separate from transporting means, as will be described more fully hereinafter. The carrier means 10 is associatable with and disassociatable from a transporting means which is herein illustrated generally at numeral 16 as a flatbed truck trailer.

The truck trailer 16 generally comprises a tractor portion 18, which is connected in the usual manner by means of a fifth wheel to a trailer portion 20 having the usual dual tire wheels 22 mounted on an axle 24, landing gear 26, and a frame 28 which is suitably connected to the axle and landing gear and which comprises generally a pair of parallel longitudinally extending side rails 30 connected together by means of a plurality of longitudinally spaced and transversely extending frame members 32. The frame members 32 extend above the upper surface of side rails 30 for providing an interrupted or slatted transporting surface for the freight carrier means 10.

The centrally located frame member 32 has enlarged hollow end portions 34 which are rigidly connected to the side rails 30. Mounted adjacent the opposite ends of plank member 32 are a pair of anchor plate means 36, each of which is pivotally mounted on a shaft 38 for a purpose to be described. Each anchor plate 36 is formed as a substantially triangular casting having projecting ear portions 40 adjacent its upper end and forming thereby suitable recesses 42 beneath such ear portions. A cover plate 44 is pivotally mounted upon a transverse pin 46. When the cover plates 44 and anchor plates 36 are located in the positions shown in the various figures, the anchor plates are adapted to receive pairs of locking pins 48 of a latching mechanism 50, as hereinafter described. The cover plates 44 may be pivoted upwardly about pins 46 and the anchor plates 36 downwardly about pins 38 beneath the cover plates, following which the cover plates may be returned to their illustrated position flush with the upper surface of member 32 so that the flat bed trailer may, if it is desired, be utilized for other materials handling operations than those covering portable freight carriers such as 10. As illustrated, the cover plates 44 are utilized primarily to hold the anchor plates in their upwardly extending positions.

The latching means indicated generally at numeral 50 is located substantially centrally of the base structure of the freight carrier means 10, it being understood that the latching means is located beneath the decking members which define the supporting surface or bottom wall of such freight carrier means. Specifically, at the opposite sides of the base structure and inwardly adjacent the side rails 14 thereof, are parallel cross rail members 52. A two arm linkage system comprising angularly related members 54 and 56 is rigidly attached to each of said cross rails 52 as by welding. Such arm members intersect at their inner ends and have rigid interconnection as at 58. Pivot means 60 and 60' interjoin the outer ends of the two sets of arm members 54 and 56 to a crosshead 62 pivoted on a central vertical axle member 64. It will be noted that each end of the crosshead 62 is pivotally joined to one set of the paired arm members 54 and 56 so that movement of either set of such arm members toward the other causes a counterclockwise motivation of the crosshead 62 as viewed in Figure 7.

A spring means 66 extends between the cross head 62 and under framing 68 of the base supporting structure for the freight carrier means. Such spring means imposes a pivotal motivation of the crosshead as caused by the movement of the sets of arm members 54—56 toward one another. Motivation of the cross rails 52, and thus the attached arms 54 and 56, toward one another may be brought about by a pair of extending finger members 70 which are mounted at the ends of each cross rail 52 and project outwardly through the side rails 14 of the base structure in separated relationship for engagement by an abutment member associated, for example, with the fork carriage of a lift truck or with a clamp member associated with gripping arms of a straddle carrier type truck, not shown. It will be understood that thrusting the finger member 70 inwardly either by an abutment member of a fork truck or a clamping portion of a straddle type truck (when such are in a ready position for gripping the load or freight carrier means), causes a responsive retraction of the latching mechanism or movement of the cross rails 52 toward one another.

Attached in the center portion of each cross rail 52 and extending outwardly through the opposite side rails 14 of the freight carrier, are the pair of locking pins 48, which are disposed in spaced relationship as best seen in Figures 7 and 8 of the drawings. Such pin members project past a wedge-shaped cast block 72 and specifically through a central triangular opening 74 thereof. The locking pins are designed to engage or fit in the indentations 42 formed beneath shoulders 40 of each anchor plate member 36.

When utilizing the fork members of a lift truck with the latching mechanism 50 it will be seen that such forks enter the spaced channel members 12 from one side of the transport 16. When the lift truck is positioned immediately adjacent one of the side rails 14 it effects abutment with finger members 70 and retraction of locking pins 48 and cross rail 52 ensues, thereby permitting the freight carrier means 10 to be disengaged from trailer portion 20 of transport means 16 when the carrier means is elevated above anchor plates 36. When the freight carrier means is disengaged from the transport means it may then be carried to any desired location by such materials handling equipment, and if lowered upon another transport means, such as a railroad flatcar, so that each wedge-block 72 engages a corresponding anchor plate 36, it is automatically locked to such transport means by simply releasing the cross rail member 52 (by removing abutment means of the materials handling equipment from contact with finger member 70) whereby spring 66 actuates crosshead 62 in a clockwise direction (Figure 7) to engage locking pins 48 between each wedge-block 72 and the corresponding anchor plate.

The anchor and latching mechanisms and freight handling method above briefly described in connection with the utilization of fork lift trucks and the like is more fully disclosed, along with other embodiments thereof, in the aforementioned copending continuation-in-part application.

The instant invention uses anchor and latching mechanisms, such as above described, in such a manner that the necessity for utilizing expensive materials handling equipment to handle freight carrier means at a small truck terminal, for example, is eliminated.

In Figure 7 and 8 there is illustrated for exemplary purposes only a manual crank means 74 which may be utilized for actuating manually the cross rail members 52 to either of the operative positions thereof. A slot 76 is provided in each side rail 14 adjacent the area of intersection between cross rail 52 and transversely extending member 54. The crank member 74 comprises two angularly related portions having a notch 78 adjacent the vertex of said portions and in the lower edge thereof, and a notch 80 formed in the end of the short arm portion of the crank. As illustrated, the crank is insertable through slot 76 and the slot 78 brought into registry with the bottom edge of slot 76 while the slot 80 is registrable with the outboard edge of cross rail 52, as shown in Figure 7. If the crank arm is then rotated to the position shown in Figure 8 about the fulcrum provided by slot 76, it effects a retraction of cross rail 52 at both sides of the freight carrier through the operation of crosshead 62, as aforesaid. Such action effects a retraction of locking pins 48 and the freight carrier is thereby conditioned to be disengaged from the transport means.

Referring now particularly to Figures 1, 2, 5 and 6 I have provided rack means for storing the freight carrier means 10 separately from the transport means 16 and for effecting controlled engaging and disengaging action between the freight carrier and transport means, as desired. The rack means is illustrated generally at numeral 90 and comprises a pair of elongated tracks 92, which may be channel beams, mounted in parallel relation to each other and supporting a plurality of upwardly-extending longitudinally spaced pairs of rocker assemblies 94. Each rocker assembly consists of a generally triangular shaped construction 96 having a pair of upwardly extending, angularly related tubular members 98 and 100 which intersect at the upper ends thereof and which are secured together by a gusset plate 102. The opposite or lower ends of the tubular members are connected together by a rocker means 104 which comprises a pair of laterally spaced curved elements 106 which straddle opposite sides of tubular members 98 and 100 and are secured together by transverse plate members 108. A longitudinally extending transverse plate 109 extends the length of the rocker 104 and connects the various elements thereof to form a bottom surface therefor. The rocker elements 106 may be secured as by welding to the lower ends of the tubular members 98 and 100. Extending rearwardly from the tubular member 98 in coplanar relation with the corresponding track 92 is a bracket 110 having an opening 112 at the outer end thereof. The opposite ends of the rocker elements are extended at 114 to provide additional rocker action of the assembly 104. An adjustable tubular member 116 is telescoped within tubular member 100 and adjustment openings 118 are provided therein in association with a locking pin 120 for adjusting the effective height of rocker assembly 94. Rigidly secured to the top of each tubular member 116 is a tubular member 122 which extends transversely of the element 116. Gussets 124 are provided for increasing the rigidity of the assembly. A reciprocable tubular member 126 is mounted in telescoping relation to tube 122 and mounts at the one end thereof a handle 128 which may be utilized for rotating together the tubes 122 and 126 in a horizontal plane and for actuating tube 126 in either direction within tube 122.

Figure 5:
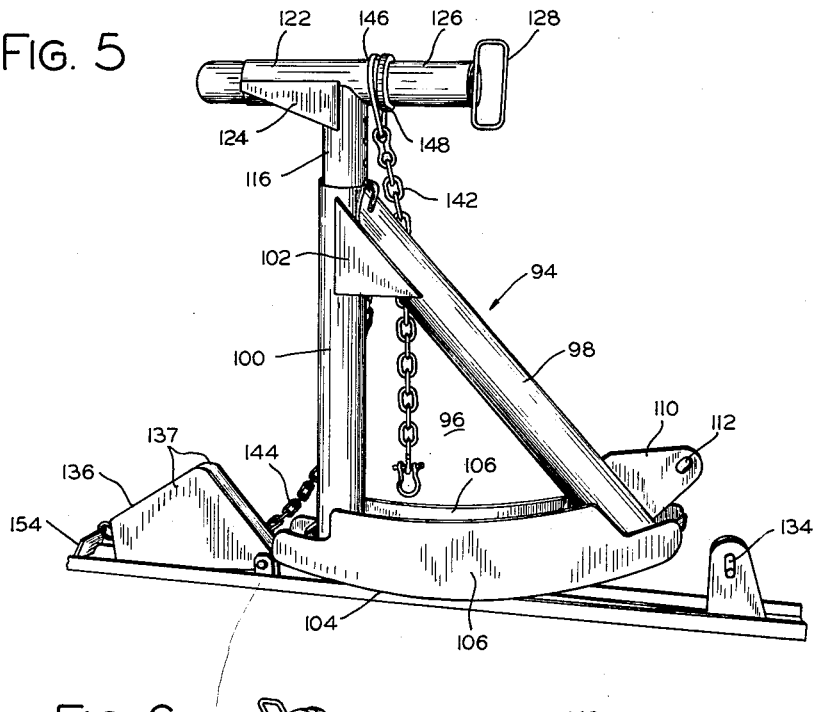
Figure 5 is a perspective view of a part of the rack means of my invention.

A bifurcated bracket member 130 is secured to the track 92 adjacent that end of each rocker assembly 94 from which bracket 110 projects, and is connectable to the corresponding bracket 110 by means of a pin and slot 132, 134. Adjacent the opposite end of each rocker assembly is located a bracket means 136 of quadrilateral configuration and consisting of a pair of parallel plate members 137 pivoted at 138 about adjacent corners thereof and held in fixed spaced relation by plate members therebetween, not shown. Each bracket member 136 is of such size and shape as to be pivotable to a holding position beneath the longitudinally extending member 109 of rocker 104 from a non-operative position thereof, as shown in Figure 5. The connection between each set of brackets 110 and 130 and the abuttable relation between each bracket 136 and corresponding rocker 104 together are adapted to main the respective rocker assembly 94 in a rearwardly rotated position, as shown in Figs. 1 and 6.

Figure 6:
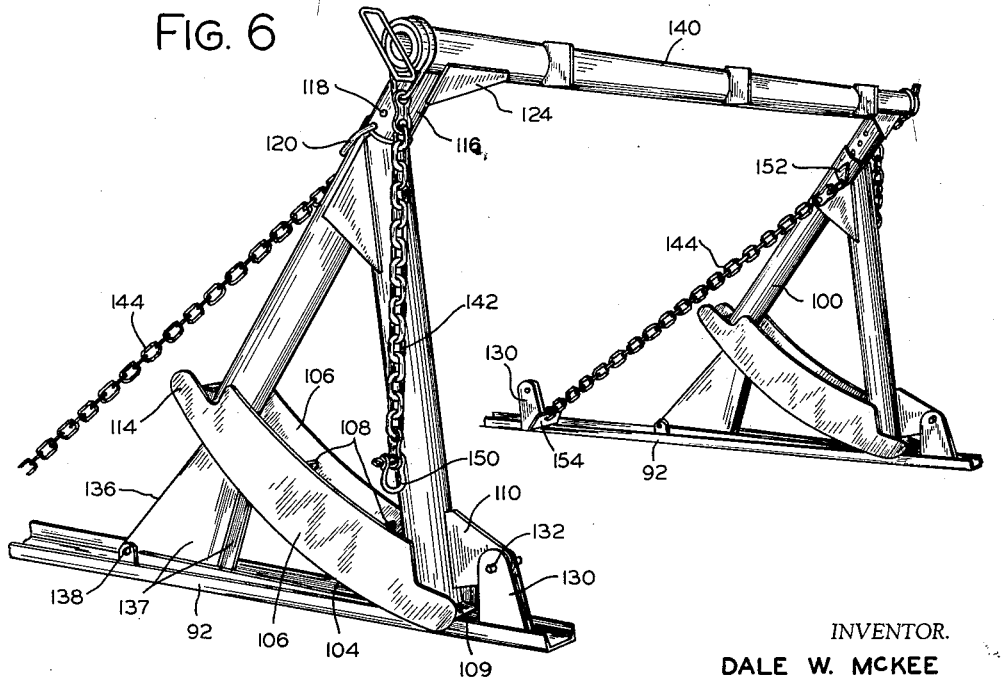
Figure 6 is a perspective view of one end of the assembled rack means.

A pair of demountable tubular members 140 are provided for telescoping engagement with reciprocable tubular members 126, as shown in Figures 1 and 6. When each pair of laterally spaced rocker assemblies 94 is connected together by means of a tubular member 140, the rack assembly 90 affords a rockable supporting structure for a freight carrier means, such as that shown at numeral 10, wherein the tubular members 140 are insertable through the transverse pocket means 12 and subsequently engagable by tubular members 126 at opposite ends of each member 140.

Associated also with each of the rocker assemblies 94 is one or more tension members, illustrated in the drawings as chains. Chains 142 and 144 are associated with each of the rearwardly located rocker assemblies 94, each of chains 142 being attached to a tubular member 122 by means of a ring 146 located inside a collar 148 and having a clevis 150 attached to the opposite end thereof; each chain 144 may be suitably attached to the leg 100 by a bracket 152 at the one end thereof and at the opposite end thereof to a plate member 154 secured to the corresponding track 92 adjacent the forwardly located bracket means 130. To each of the forwardly located rocker assemblies 94 is connected a chain 156. Eye-bolts 158 and 160 are provided adjacent the sides of each end of frame member 32 for connection with the free ends of chains 156 and 142, respectively. Each of the aforementioned chains is of predetermined length, each correspondingly numbered pair being equal in length to each other.

Figure 4:
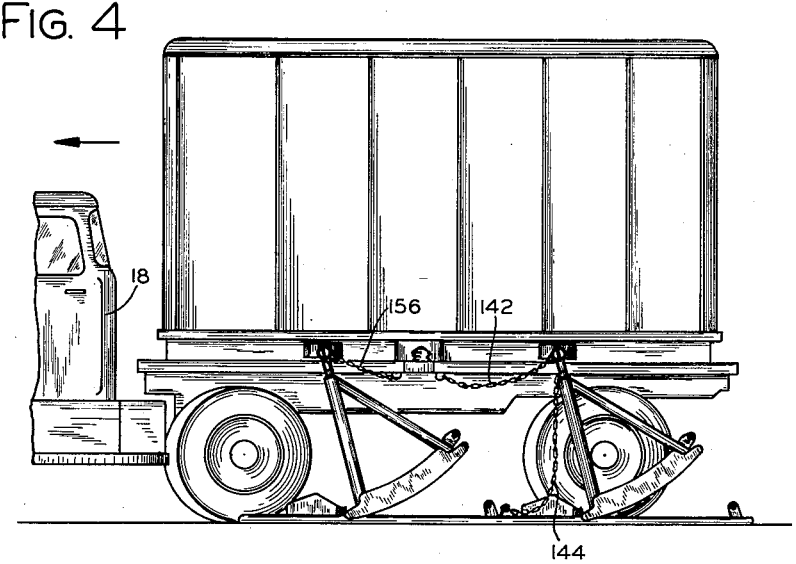
Figure 4 is a view of the structure shown in Figure 3 following actuation thereof to a position wherein the freight carrier means is associated with the transporting means preparatory to transporting the carrier means to another location.

In operation, a transporting means such as the tractor trailer outfit illustrated at numeral 16, may disassociate therefrom a freight carrier such as 10 in the following manner:

The transporting means with the freight carrier locked in position by means of the anchor and latching mechanisms 36 and 50 is backed into a position ahead of and intermediate the rails 92 of the rack assembly 90. Preferably, the rails 92 are permanently secured to the support therefor in predetermined spaced relation. With the transporting means in such a position the tubular connecting members 140, which are demounted from the rack assembly, are inserted through opposite ones of the pockets 12 in the freight carrier 10. The transporting means and freight carrier are then backed into a position as shown in Figure 4 in which each tubular member 122 is turned from the position shown in Figure 5 to axial alignment with connecting members 140 and the tubes 126 then inserted in opposite ends of connecting members 140. Preferably at this time the crank arm 74 is operated to actuate lock pins 48 of latch means 50 out of locking relation with anchor plates 36, as hereinbefore described. The chains 142 and 156 are then connected manually on each side of the truck to eye-bolts 160 and 158, respectively, of the transporting means. The vertically adjustable tubular members 116 are preferably adjusted such that the connecting members 140 abut or nearly abut the upper surfaces of transverse pockets 12 when the rocker assemblies 94 are positioned as shown in Figure 4, in which each rocker assembly is disconnected from both of the associated bracket means 130 and 136.

Figure 2:
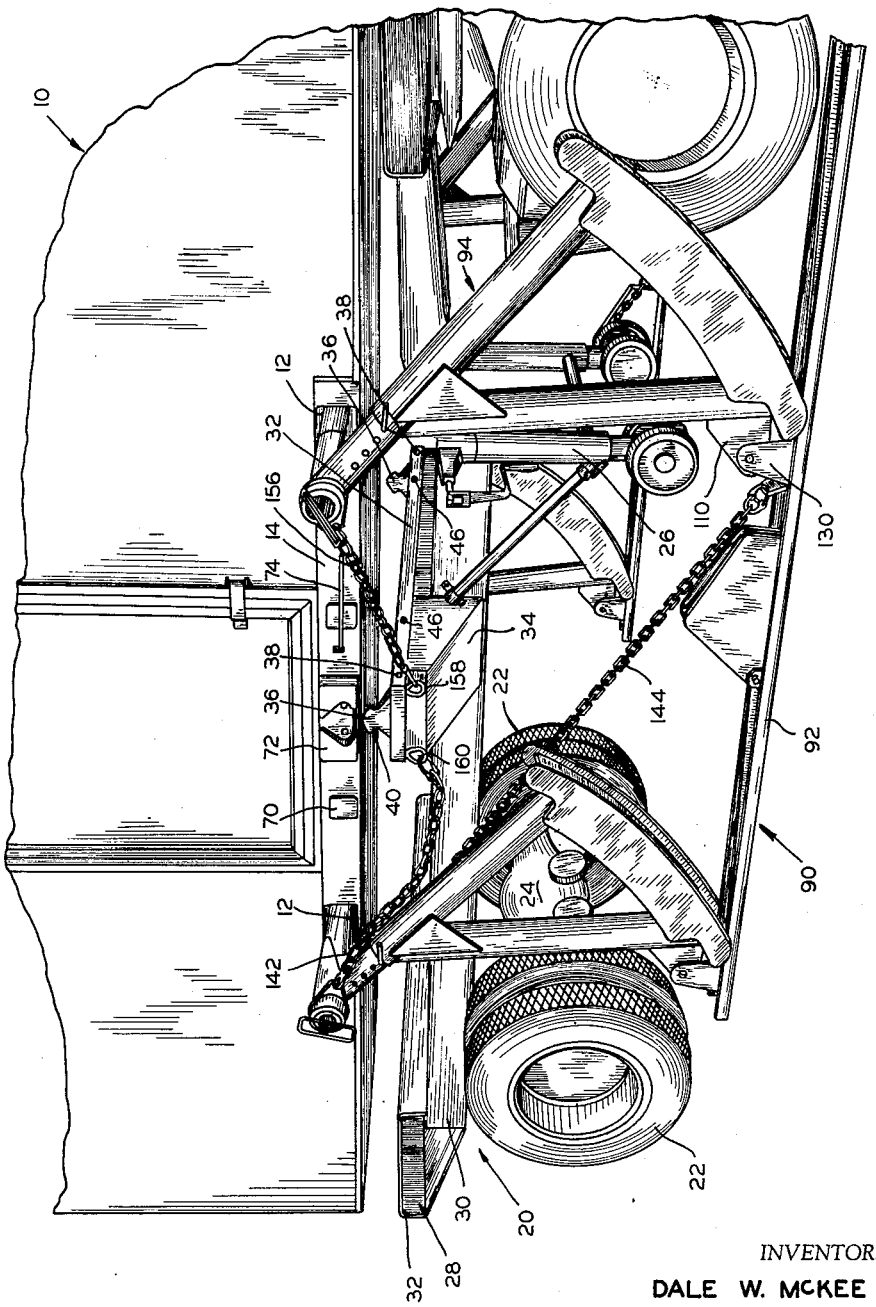
Figure 2 is an enlarged perspective view of my invention in greater detail.

With the connecting members 140 in position as described, the latching mechanism 50 disconnected, and the chains attached to the transporting means as before noted, the tractor trailer unit is moved rearwardly until such time as further rearward movement thereof is stopped due to full extension of chains 144. When the chains 144 are taut the rocker assemblies 94 are positioned as illustrated in Figures 1, 2 and 6, in which position the brackets 110 are connected to corresponding brackets 130 and the brackets 136 rotated about pivots 138 to upright positions under curved longitudinal plates 109 of the rocker assemblies. Each chain 144 is of such a length that tautness thereof will occur at positions of registrability between brackets 130 and 110 and of abutment between the one end of brackets 136 and plates 109.

Upon initiation of rearward movement of the transporting means from the position illustrated in Figure 4 toward that just described, the chains 156 become taut and effect a rearward rocking motion of both rocker assemblies 94, inasmuch as the forward rocker assembly is connected to the rearwardly moving trailer unit by means of the chains 156, and the rear rocker assembly must follow. The tubular legs 98 of each rocker assembly 94 are substantially longer than the legs 100 thereof, so that rearward rocking movement along tracks 92 effects generally diagonally upwardly directed movement of connecting members 140, thereby causing the freight carrier means 10 to be lifted above anchor plates 36 of the trailer while simultaneously moving rearwardly therewith. The chains 156, of course, act directly only on the forwardly located rocker assemblies which transmit through the freight carrier a rearwardly directed force causing the rearwardly located rocker assemblies to follow. The chains 156 are of such predetermined length that with a given rocker assembly design, the freight carrier means will be lifted clear of the transporting means, including anchor plates 36, when the chains 144 become taut.

The length and curvature of each pair of arcuate rocker elements 106 and the difference in length between each pair of intersecting tubular members 98 and 100 is designed such that the freight carrier means moves rearwardly during disengagement thereof from the transporting means at substantially the same rate as does the transporting means, whereby said carrier means is, in effect, lifted substantially directly upwardly out of engagement with the anchor plate members 36 during rearward motion of the rocker assemblies. In this manner the carrier means is disengaged from the transport means without causing any damage to either the anchor or latching mechanism. During such disengaging operation the chains 142 tend to remain slightly slack.

When the various parts are positioned as shown in Fig. 1, the chains 142 and 156 may be disconnected from the eye-bolts 160 and 158 and the transporting means driven out from under the freight carrier means which then remains suspended for temporary storage on the rack assembly.

Figure 3:
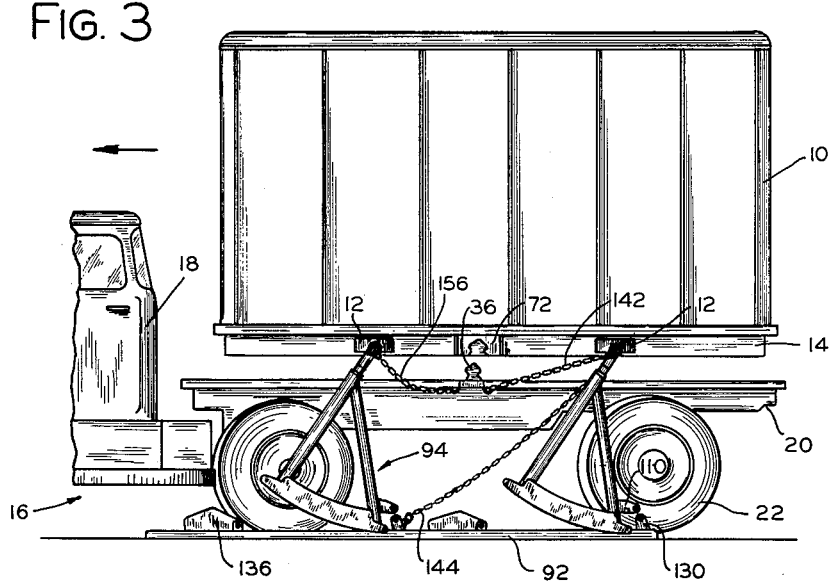
Figure 3 is a schematic view in side elevation of the rack means and associated structure of my invention shown in an operative position preparatory to associating freight carrier means with transporting means.

When it is desired to associate the freight carrier means with a transporting means, the latter is backed between the channel members 92 of the rack assembly to a position wherein the pairs of chains 142 and 156 may be connected to the eye-bolts 160 and 158, respectively, on the trailer unit. With the chains attached as illustrated in Figure 1, the transporting means is backed a slight amount to permit the removal of pins 132 and forward rotation of brackets 136, thereby freeing the rocker assemblies 94 for forward movement. The transporting means is then driven slowly forwardly which first causes the chains 142 to become taut and rotate the rocker assemblies slightly forwardly as shown in Fig. 3. The chains 142 remain taut until the freight carrier means is actuated forwardly over center relative to the rock assemblies, at which time the chains 156 become taut and the chains 142 slacken slightly.

During such engaging movement between carrier 10 and trailer 20, the carrier moves essentially along a curved diagonal path until the openings in center blocks 72 are engaged with anchor plates 36. The freight carrier in reengaging anchor plates 36 follows essentially the same path of movement as during disengagement therefrom. Since both pairs of chains 142 and 156 are always at least nearly taut it will be apparent that the freight carrier cannot move except in a predetermined restricted path, which is controlled by the forward movement of the transporting means and the design of the rocker assemblies and chains. The chains 142 and 156 should be of such length that a minimum of slack therein is permitted at any time consistent with an operator's ability to manually engage same with the eye-bolts 158 and 160.

After reengagement, the crank arm 74 is rotated to the position shown in Figure 7, thereby effecting locking engagement between the carrier and transporting means by means of outward motivation of lock pins 48. The chains 142 and 156 are then detached from the transporting means and the tubular members 126 actuated outwardly of connecting tubes 140 and rotated with tubes 122 approximately 90° to the position shown in Fig. 5, whereupon the transporting means is driven forwardly from the rack assembly with the freight carrier means and the connecting tubes 140 are then removed from the pockets 12 of the carrier means and stored for subsequent use.

From the foregoing it will now be apparent that I have provided simple and efficient means and method for associating and disassociating suitable portable freight carrier means with transporting means, and further have provided such means for storing freight carrier means for an indefinite period of time between movements thereof from a freight terminal and the like to another destination. It will now be apparent that my invention enables the efficient use of portable freight carrier means without necessitating investment in expensive materials handling equipment.

In addition to the foregoing description of the elements and mechanism of my invention, it is believed that the method involved therein has been amply set forth, but for purposes of clarity it may be well to outline briefly its improved sequence.

It is my intention to effect the unloading of freight carrier means from freight transporting means by the employment of a rack means, and to that end the steps of the method involved require first disposing the freight carrier means in connected relationship to the rack means, following which it is requisite to unlock the freight carrier means from locked engagement with the transporting means and then, by suitably connecting the rack means to the transporting means, the freight carrier means may be completely disengaged from the transporting means for storage on the rack means by causing movement in one direction of the transporting means.

The method of loading or reengagement between freight carrier and transporting means is substantially the reverse of the above described sequence.

While the foregoing description and disclosure is directed to a particular embodiment of means for disassociating and associating freight carrier and transporting means, it is to be understood that numerous changes and substitutions of parts may be made therein without departing from the scope and spirit of the invention. As a consequence, it is not my intention to be limited to the particular device embodying the features of my invention as hereinabove described and illustrated in the accompanying drawings, except as may appear in the claims appended.

I claim:

1. In a freight carrier handling system having a transporting means and freight carrier means normally associated therewith in locked relation thereto, means for disassociating the freight carrier means from the transporting means comprising a pair of longitudinally extending track members extending in spaced parallel relation such that the transporting means and freight carrier means may be passed therebetween, a pair of upwardly extending and longitudinally spaced rocker means mounted upon said track members for rocking movement relative thereto, said rocker means including curved lower members adapted for rocking motion on the corresponding track means and converging legs extending upwardly from opposite end portions of each curved member, demountable means extending transversely of said track means and through base portions of the freight carrier means adapted to be connected through base at opposite ends thereof to said pairs of rocker means while said freight carrier means is associated with said transporting means, and at least one tension member connected to each rocker means, said tension members being extendible in opposite directions for connection of opposite end portions thereof with portions of the transporting means, movement of the transporting means in one direction following a conditioning of the freight carrier means for disassociation therefrom effecting a rocking motion of said pair of rocker means whereby to effect concurrent movement of the freight carrier means with the demountable means in said one direction and upwardly of said transporting means as one of said tension members becomes taut.

2. A method for associating a portable freight carrier means having elongated tension members operatively connected therewith which is stored in a stationary elevated position on longitudinally spaced pairs of rockable rack means with a movable transporting means, comprising the steps of disposing the transporting means beneath the freight carrier means and between the elements of the pairs of rack means extending said tension members in opposite directions and connecting same with the transporting means and moving the transporting means in one direction to cause tension alternately in said tension members for simultaneously moving the rack means to lower the freight carrier means toward the transporting means and to move the freight carrier means downwardly in said one direction at a rate substantially equal to the rate of movement of the transporting means in said one direction whereby to effect proper engagement of the freight carrier means with the transporting means.

3. A method for associating a portable freight carrier means having elongated tension members operatively connected therewith which is stored in a stationary elevated position on longitudinally spaced rockable rack means with a movable transporting means, comprising the steps of disposing the transporting means, beneath the freight carrier means, extending said tension members in opposite directions and connecting same with the transporting means and moving the tranporting means in one direction for simultaneously rocking the rack means to lower the freight carrier means toward the transporting means and to move the freight carrier means downwardly and in said one direction at a rate substantially equal to the rate of movement of the transporting means in said one direction by initially causing tension in one of the tension members and then causing tension in the other tension member as the freight carrier means moves over-center in its downward movement with the rack means causing a relaxation of tension in the first tension member.

4. A method as claimed in claim 3 plus the steps of disconnecting said tension members from the transporting means, locking the freight carrier means to the transporting means, disconnecting the rack means from the freight carrier means, and moving the transporting means and freight carrier means away from the vicinity of the rack means.

5. A rack assembly for use in a freight carrier handling system which includes a transporting means and portable freight carrier means, comprising a pair of transversely spaced and longitudinally extending parallel base members, first and second pairs of transversely spaced and upwardly extending rocker means rockable in either direction on respective ones of said base members, said pairs being spaced longitudinally one from the other on said base members, first and second elongated demountable members adapted to be connected to the freight carrier means, connecting means mounted on the upper ends of said pairs of rocker means for rotation in a generally horizontal plane, said latter means being registrable with opposite ends of said demountable members when said latter means are located in planes transverse to said rocker means, an elongated tension member permanently connected to each pair of rocker means, said tension members being extendible in opposite directions for connection with the transporting means when the latter means is disposed intermediate said pairs of rocker means, means associated with at least one of said parallel base members for selectively holding said rocker means and demountable members in a predetermined rocked position, and means connecting at least one of said base members to one of said rocker means for limiting rocking movement of said rocker means substantially to a rocked position wherein said associated means is adapted to hold the rocker means in predetermined rocked position.

6. In a freight carrier handling system which includes a transporting means, portable freight carrier means having end portions and complementary locking elements located on both such means for interengagement, first and second pairs of transversely spaced rack means supporting the portable carrier means in elevated position above the transporting means, a first tension member operatively connected at one end to one end portion of the freight carrier means and at the other end to the transporting means, a second tension member operatively connected at one end to the other end portion of the freight carrier means and at the other end to the transporting means, said first and second tension members extending in opposite directions from the respective end portions of the freight carrier means to points of connection with the transporting means and being of such predetermined length that movement of the transporting means in one direction causes simultaneous movement of the rack means and movement of the freight carrier means with the rack means downwardly and in said one direction at a rate controlled in part by said tension members as such movement of the transporting means initially causes tension in the first tension member and then causes tension in the second tension member as the freight carrier means moves over-center in its downward movement, said rate of movement being such that the locking elements of the freight carrier and transporting means are brought into registry as the freight carrier means is moved downwardly with movement of the rack means from its position of support on the rack means to a position of support on the transporting means.

7. A freight carrier handling system as claimed in claim 6 wherein said locking elements are located centrally of the freight carrier and transporting means, and the first and second tension members are directly connected to opposite rack means and are directed downwardly from said rack means to connect with the transporting means at a location adjacent the locking element thereof.

8. In a freight carrier handling system which includes a transporting means and portable freight carrier means, first and second pairs of transversely spaced rockable rack means supporting the portable carrier means in elevated position above the transporting means, a first tension member operatively connected at one end to a portion of the freight carrier means and at the other end to the transporting means, a second tension member operatively connected at one end to a portion of the freight carrier means and at the other end to the transporting means, said first and second tension members extending in opposite directions from their operative connections with the freight carrier means to points of connection with the transporting means and being of such predetermined length that movement of the transporting means in one direction causes simultaneous movement of the rack means and movement of the freight carrier means with the rack means downwardly and in said one direction at a rate controlled in part by said tension members as such movement of the transporting means initially causes tension in the first tension member and then causes tension in the second tension member as the freight carrier means moves over-center in its downward movement with movement of the rack means and from its position of support on the rack means to a position of support on the transporting means.

9. A freight handling system as claimed in claim 8 wherein movement of the transporting means in the other direction causes disassociation of the freight carrier from the transporting means as tension is applied to said second tension member to cause simultaneous upward movement of the rack means, and additional means limiting such upward movement of the rack means.

References Cited in the file of this patent

UNITED STATES PATENTS

| | | |
|---|---|---|
| 416,519 | Troxell | Dec. 3, 1889 |
| 493,980 | Coler | Mar. 21, 1893 |
| 846,725 | Brown et al. | Mar. 12, 1907 |
| 1,048,722 | Morgan | Dec. 31, 1912 |
| 1,049,210 | Cole | Dec. 31, 1912 |
| 1,122,686 | Clark et al. | Dec. 29, 1914 |
| 2,245,853 | Eagleson | June 17, 1941 |
| 2,605,885 | Baldwin | Aug. 5, 1952 |
| 2,614,710 | Gregory | Oct. 21, 1952 |
| 2,715,971 | Cox | Aug. 23, 1955 |
| 2,770,375 | Neighbour et al. | Nov. 13, 1956 |
| 2,868,401 | Lelois | Jan. 13, 1959 |

FOREIGN PATENTS

| | | |
|---|---|---|
| 180,860 | Great Britain | June 8, 1922 |
| 1,000,795 | France | Feb. 15, 1952 |

UNITED STATES PATENT OFFICE
CERTIFICATE OF CORRECTION

Patent No. 2,983,394                  May 9, 1961

Dale W. McKee

It is hereby certified that error appears in the above numbered patent requiring correction and that the said Letters Patent should read as corrected below.

Column 1, line 48, for "work" read -- fork --; column 8, line 69, after "and" insert -- adapted to be connected --; lines 70 and 71, for "adapted to be connected through base" read -- for connection --.

Signed and sealed this 3rd day of October 1961.

(SEAL)
Attest:

ERNEST W. SWIDER                      DAVID L. LADD
Attesting Officer                      Commissioner of Patents